(No Model.)

J. B. MONFORT.
DENTIST'S CAP CROWN SLITTER.

No. 553,718.　　　　　　　　Patented Jan. 28, 1896.

WITNESSES:　　　　　　　　　　INVENTOR:

UNITED STATES PATENT OFFICE.

JOSEPH B. MONFORT, OF FAIRFIELD, IOWA, ASSIGNOR TO THE S. S. WHITE DENTAL MANUFACTURING COMPANY, OF PHILADELPHIA, PENNSYLVANIA.

DENTIST'S CAP-CROWN SLITTER.

SPECIFICATION forming part of Letters Patent No. 553,718, dated January 28, 1896.

Application filed December 23, 1895. Serial No. 573,006. (No model.)

*To all whom it may concern:*

Be it known that I, JOSEPH B. MONFORT, a citizen of the United States, residing at Fairfield, in the county of Jefferson and State of Iowa, have invented certain new and useful Improvements in Dentists' Cap-Crown Slitters; and I do hereby declare the following to be a full, clear, and exact description of the invention, such as will enable others skilled in the art to which it appertains to make and use the same.

My object is to provide a dentist's implement for slitting cap-crowns upon natural teeth or teeth-roots to facilitate the ready removal of such crowns when it may be desired to remove either single cap-crowns or such as constitute the means by which bridge-dentures are supported upon natural teeth or teeth-roots.

Figure 2:
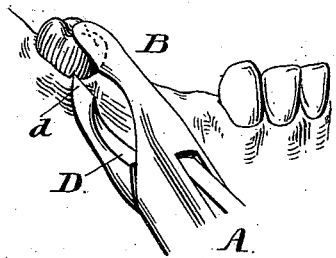
Figure 1:
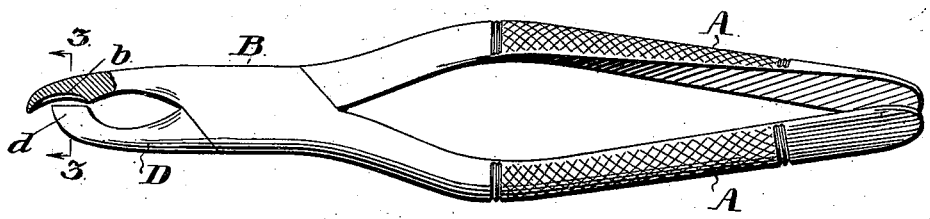
Figure 4:
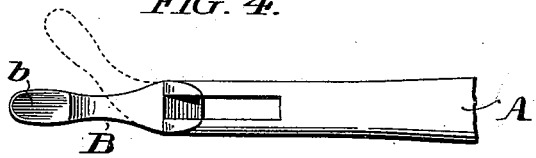
Figure 3:
Figure 5:
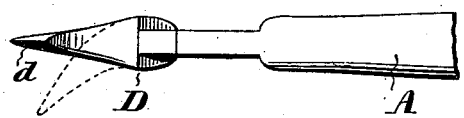

In the accompanying drawings, which show the preferred construction of the implement constituting my invention, Figure 1 is a longitudinal view with the bearing-jaw in section. Fig. 2 is a view in perspective designed to show the manner of using the implement. Fig. 3 is a section on the line 3 of Fig. 1. Figs. 4 and 5 are inside views showing, separately, the bearing and the slitting jaws with portions of the handles, a modification being indicated in dotted lines.

The implement has suitable forceps-like handles A A jointed together in well-known way and a bearing jaw or beak B, and a slitting jaw or beak D. The beak B is longer than and projects at its outer end beyond the end of the beak D, which is provided with a suitable cutter or slitter *d*.

In operation the bearing-surface of the jaw B is adjusted to bear upon the coronal surface or cuspid end of the metallic cap-crown to be removed, (see Fig. 2,) with the slitter pressed against the natural tooth or root adjacent to the extremity of the cap-crown opposite that borne upon by the bearing-jaw, and then by compressing the handles the cap-crown may easily be slit or cut from end to end. After this the slit may readily be widened or opened out until the cap-crown is sufficiently loosened to permit of its removal from the tooth or root.

If desired, the same cap-crown may be replaced, the edges of the slit having been brought together and soldered, as will readily be understood.

By the preferable way shown of forming the bearing-jaw with the concave or curved recess *b* a more secure bearing or better hold is secured upon the cap-crowns than could be had were this jaw provided with a flat or regular bearing.

I do not wish to be understood as limiting my invention to the precise construction shown by the drawings and above described, as some changes may be made.

The jaws of the implement may be curved either to the right or to the left, as will be understood by reference to dotted lines, Figs. 4 and 5, for convenience of access to the lingual or palatal walls of cap-crowns.

I claim as my invention—

The dentist's implement for slitting cap-crowns, provided with jointed handles and having the bearing-jaw for contact with the coronal surface or cuspid end of a cap-crown, and the shorter jaw provided with a slitter for slitting the cap-crown at its side, substantially as set forth.

In testimony whereof I affix my signature in presence of two witnesses.

JOSEPH B. MONFORT.

Witnesses:
 CHAS. D. LEGGETT,
 WM. W. FRY.